(12) United States Patent
Kimura et al.

(10) Patent No.: US 12,540,113 B2
(45) Date of Patent: Feb. 3, 2026

(54) METHOD OF PRODUCING CARBOXYLIC ACID FLUORIDE

(71) Applicant: KANTO DENKA KOGYO CO., LTD., Tokyo (JP)

(72) Inventors: Ryo Kimura, Gunma (JP); Shohei Maehara, Gunma (JP); Akiko Nakanishi, Gunma (JP)

(73) Assignee: KANTO DENKA KOGYO CO., LTD., Tokyo (JP)

( * ) Notice: Subject to any disclaimer, the term of this patent is extended or adjusted under 35 U.S.C. 154(b) by 896 days.

(21) Appl. No.: 17/637,618

(22) PCT Filed: Aug. 26, 2020

(86) PCT No.: PCT/JP2020/032110
§ 371 (c)(1),
(2) Date: Feb. 23, 2022

(87) PCT Pub. No.: WO2021/039817
PCT Pub. Date: Mar. 4, 2021

(65) Prior Publication Data
US 2022/0274908 A1 Sep. 1, 2022

(30) Foreign Application Priority Data

Aug. 27, 2019 (JP) .................................. 2019-154843

(51) Int. Cl.
*C07C 51/363* (2006.01)
(52) U.S. Cl.
CPC ................. *C07C 51/363* (2013.01)

(58) Field of Classification Search
CPC .......... C07C 51/58; C07C 53/46; C07C 53/48
USPC .......................................................... 562/603
See application file for complete search history.

(56) References Cited

U.S. PATENT DOCUMENTS 6,489,510 B1   12/2002   Braun et al.
6,723,874 B1   4/2004    Braun et al.

FOREIGN PATENT DOCUMENTS

| CN | 102964231 | * | 3/2013 |
| DE | 2460821 A1 | | 6/1976 |
| JP | 2001504845 A | | 4/2001 |
| JP | 2002531426 A | | 9/2002 |

OTHER PUBLICATIONS

DE 2460821, 1976 machine translation.*
Rathke, et al. Acetyl Fuoride, e-EROS Encyclopedia of Reagents for Organic Synthesis, year 2010, 1-6.*
Machien translation CN102964231.by Zhang, Mar. 2013.*
Buxton, M.W. et al., Journal of Fluorine Chemistry, 1973, vol. 2, No. 3, pp. 231-245.
ISR of PCT/JP2020/032110, dated Oct. 13, 2020.

* cited by examiner

*Primary Examiner* — Ana Z Muresan
(74) *Attorney, Agent, or Firm* — Dority & Manning, P.A.

(57) ABSTRACT

An object is to provide a method of producing a carboxylic acid fluoride at an increased product yield in a reaction system without forming HCl as a by-product, in other words, without forming a complex between HCl and a carboxylic acid fluoride as a product.
The method comprising reacting a carboxylic acid chloride with a metal fluoride. In this production method, the carboxylic acid is a carboxylic acid having a carbon number of 1 to 7, the carboxylic acid is a carboxylic acid substituted with fluorine, or the carboxylic acid is trifluoroacetic acid.

10 Claims, No Drawings

METHOD OF PRODUCING CARBOXYLIC ACID FLUORIDE

TECHNICAL FIELD

The present invention relates to a method of producing a carboxylic acid fluoride, more specifically to a method of producing a carboxylic acid fluoride by using a metal fluoride, and particularly to a method of producing trifluoroacetyl fluoride.

BACKGROUND ART

As a method of producing a carboxylic acid fluoride, there has conventionally been known, for example, a method for producing trifluoroacetyl fluoride ($CF_3C(O)F$) comprising photochemically oxidizing halogenated ethane, such as $CF_3CHClF$, to a carboxylic acid chloride (Patent Literature (PTL 1) or a method of reacting an acid chloride with a hydrogen fluoride adduct of ammonium hydrofluoride or of a hydrofluoride of an organic nitrogen base (PTL 2).

However, the methods of PTL 1 and PTL 2 have problems in which HCl is formed as a by-product in the reaction system to form a complex with $CF_3C(O)F$ as a product, thereby lowering the yield of free $CF_3C(O)F$. Moreover, the method of PTL 1 also has the problem of equipment, where a photoreaction apparatus is needed. Further, the method of PTL 2 also has the problem of complicating the process, where a specific hydrogen fluoride adduct needs to be prepared.

CITATION LIST

Patent Literature

PTL 1: Japanese Unexamined Patent Application Publication (Translation of PCT Application) No. 2001-504845
PTL 2: Japanese Unexamined Patent Application Publication (Translation of PCT Application) No. 2002-531426

SUMMARY OF INVENTION

Technical Problem

An object of the present invention is to resolve the above-mentioned problems with the conventional methods of producing a carboxylic acid fluoride.

Solution to Problem

The present invention provides the following.
[1] A method of producing a carboxylic acid fluoride, comprising reacting a carboxylic acid chloride with a metal fluoride.
[2] The method according to [1], where the carboxylic acid is a carboxylic acid having a carbon number of 1 to 7.
[3] The method according to [1] or [2], where the carboxylic acid is a carboxylic acid substituted with fluorine.
[4] The method according to [3], where the carboxylic acid is a perfluorocarboxylic acid.
[5] The method according to [4], where the carboxylic acid is trifluoroacetic acid.
[6] The method according to any of [1] to [5], where the metal fluoride is supported on at least one carrier selected from the group consisting of activated carbon, alumina, zeolites, and metal foams.
[7] The method according to any of [1] to [6], where the metal fluoride is at least one selected from the group consisting of an alkali metal fluoride, an alkaline earth metal fluoride, and a transition metal fluoride.
[8] The method according to [7], where the alkali metal fluoride is at least one selected from the group consisting of lithium fluoride, sodium fluoride, cesium fluoride, and potassium fluoride.
[9] The method according to [7], where the alkaline earth metal fluoride is at least one selected from the group consisting of magnesium fluoride, calcium fluoride, and barium fluoride.
[10] The method according to [7], where the transition metal fluoride is at least one selected from the group consisting of chromium fluoride, molybdenum fluoride, manganese fluoride, iron fluoride, cobalt fluoride, copper fluoride, nickel fluoride, zinc fluoride, and silver fluoride.
[11] The method according to any of [1] to [10], where a reaction temperature is 100° C. to 500° C.

Advantageous Effects of Invention

According to the present invention, the by-product is a metal chloride since a metal fluoride is used as a reactant, and hence HCl is not formed as a by-product in the reaction system. Consequently, the product yield increases since HCl does not form a complex with a carboxylic acid fluoride as a product. The method of the present invention does not need to use a photoreaction apparatus or a specific hydrogen fluoride adduct and hence does not have the problem of complicating the process.

DESCRIPTION OF EMBODIMENTS

[Action]
The present invention provides a method of producing a carboxylic acid fluoride, comprising reacting a carboxylic acid chloride with a metal fluoride ($MF_n$, where M is a metal atom and n represents the valence of M). In this reaction, when M is a monovalent alkali metal, a metal chloride (MCl) but not HCl is formed as a by-product as shown in the following reaction formula. Consequently, the problem of forming a complex between the product and HCl is resolved. When M is n-valent, a metal fluoride is represented by $MF_n$ and a metal chloride is represented by $MCl_n$.

[Reaction Formula 1]

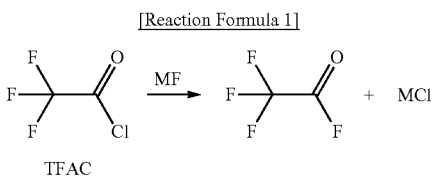

TFAC

[Acid Chlorides]
Examples of the acid chloride as a raw material of the present invention include acid chlorides derived from carboxylic acids having a carbon number of 1 to 7, preferably acid chlorides derived from carboxylic acids having a carbon number of 2 to 7. Exemplary carboxylic acids having a carbon number of 1 to 7 include formic acid, acetic acid, propanoic acid, n-butanoic acid, isobutanoic acid, n-pentanoic acid, isopentanoic acid, neopentanoic acid, n-hexanoic acid, isohexanoic acid, neohexanoic acid, n-heptanoic acid, isoheptanoic acid, neoheptanoic acid, and combinations of these carboxylic acids. The hydrogen atoms on these carboxylic acids may be replaced by fluorine, and perfluorocarboxylic acid chlorides, in which all the hydrogen atoms are replaced by fluorine atoms, are preferable. Specific examples of the carboxylic acid chloride include trifluoroacetyl chloride (TFAC), perfluoro-n-butyryl chloride, and perfluoro-n-heptanoyl chloride.

[Metal Fluorides]

The metal fluoride as a fluorinating agent is represented by a formula of $MF_n$ (where M is a metal atom and n is the valence of the metal). Exemplary metal fluorides include alkali metal fluorides, alkaline earth metal fluorides, and transition metal fluorides. Two or more of these may be combined. Exemplary alkali metal fluorides include lithium fluoride, sodium fluoride, and potassium fluoride. Exemplary alkaline earth metal fluorides include magnesium fluoride, calcium fluoride, and barium fluoride. Exemplary transition metal fluorides include chromium fluoride, molybdenum fluoride, manganese fluoride, iron fluoride, cobalt fluoride, copper fluoride, nickel fluoride, zinc fluoride, and silver fluoride. As chromium fluoride, any of chromium(III) fluoride, chromium(VI) fluoride, and a mixture thereof may be used. As molybdenum fluoride, any of molybdenum(IV) fluoride, molybdenum(V) fluoride, molybdenum(VI) fluoride, and mixtures thereof may be used. As manganese fluoride, any of manganese(II) fluoride, manganese(III) fluoride, manganese(IV) fluoride, and mixtures thereof may be used. As iron fluoride, any of iron(II) fluoride, iron(III) fluoride, and a mixture thereof may be used. As cobalt fluoride, any of cobalt(II) fluoride, cobalt(III) fluoride, and a mixture thereof may be used. As copper fluoride, copper(I) fluoride, copper(II) fluoride, and a mixture thereof may be used. As for nickel fluoride and zinc fluoride, divalent metal fluorides exist in a stable manner. As silver fluoride, any of silver(I) fluoride, silver(II) fluoride, silver(III) fluoride, and mixtures thereof may be used.

In the present invention, the metal fluoride may be used by being supported on a carrier. Exemplary carriers include porous substances, such as activated carbon, alumina, zeolites, and metal foams. Two or more of these may be combined. For example, $CrF_3/C$ can be prepared by filling a reactor with $CrCl_3/C$ and allowing HF to flow through the reactor for halogen exchange by HF. A metal fluoride, by being supported on a carrier, improves formability and thus can be formed, in addition to the use as powder, as pellets (cylindrical, a particle size of 0.5 to 30 mm, for example), honeycomb shapes, particulates (spindle-shaped, a particle size of 0.5 to 30 mm, for example), spherical shapes (particle size of 0.5 to 30 mm, for example), and other aggregates excluding powder, for example. Moreover, a metal fluoride, by being supported on a carrier, improves handleability compared with a metal fluoride used as powder. Consequently, an advantage of less causing the problem of lowering reaction efficiency due to flow channels of a raw material gas formed by solidification of a metal fluoride; an advantage of less causing sintering between unreacted metal fluoride and a metal chloride formed as a by-product after the reaction, for example, are obtained.

[Reaction Conditions]

Exemplary conditions for the fluorination reaction include the following.

Reaction temperature: preferably 100° C. to 500° C., more preferably 200° C. to 500° C., more preferably 200° C. to 350° C., more preferably 200° C. to 320° C.

Time for using a metal fluoride: preferably 1 to 10 hours, more preferably 2 to 4 hours (time as a guide for exchanging a metal fluoride although the contact time between an acid chloride and the metal fluoride is short)

[Reaction Apparatus]

An exemplary reaction apparatus is configured to allow a raw material gas to flow from one end to the other end of a cylindrical tube that is equipped with a heater for adjusting the reaction temperature and that is filled with a metal fluoride of various shapes. As for the direction in which a raw material gas is allowed to flow, a cylindrical tube filled with a metal fluoride is preferably placed extending in the vertical direction since the raw material gas is allowed to flow uniformly from the top to the bottom little by little by exploiting the gravity. Meanwhile, when a cylindrical tube is placed extending in the vertical direction to allow a raw material gas to flow from the bottom to the top, it is desirable in view of reaction efficiency to dispose metal fluoride pellets having a large particle size in the lower portion of the cylindrical tube and to dispose metal fluoride powder having a small particle size in the upper portion of the cylindrical tube. Exemplary materials of the reaction apparatus include corrosion-resistant metals, such as stainless steel, Inconel, Monel, Hastelloy, and nickel. Among these, nickel is preferable in view of corrosion resistance.

[Inert Gas]

To carry out the present invention, an inert gas is used for diluting a raw material gas, drying a reactor, and so forth. Exemplary inert gases include nitrogen ($N_2$) and noble gases (helium, argon, xenon, and so forth).

EXAMPLES

The present invention will be described specifically by means of the following examples. However, the present invention is by no means limited to the following examples.

[Example 1] (Production Method Using NaF)

In all of Experiment No. 1-1 to 1-8, a reactor was placed extending in the vertical direction and filled with NaF pellets disposed in the lower portion and NaF powder on the NaF pellets to prevent falling of the NaF powder and clogging due to the NaF powder being swept by a gas flow. In Experiment No. 1-1 to 1-4, NaF pellets were disposed further on the NaF powder. As the size of the NaF pellets, the diameter was 1 mm and the height was 3 mm. The particle size of the NaF powder was 5 to 15 μm in Experiment No. 1-1 to 1-4, 200 to 500 μm in Experiment No. 1-5 to 1-7, and 60 μm in Experiment No. 1-8. After filled with NaF, the reactor was heated to higher than 250° C. and subjected to drying by allowing $N_2$ to pass through from the bottom of the reactor. After drying, the reactor was heated to 300° C., and a raw material gas ($CF_3C(O)Cl$) (TFAC) was introduced from the bottom of the reactor. The formation of $CF_3C(O)F$ (TFAF) was confirmed by gas chromatography (GC), and the formed $CF_3C(O)F$ (TFAF) was trapped. The flow rate of the raw material gas was controlled by a mass flow controller (MFC). The experimental conditions are shown in Table 1, and the experimental results are shown in Table 2.

TABLE 1

| | | | Experimental Conditions | | | |
|---|---|---|---|---|---|---|
| Experiment No. | Reactor size | TFAC introduction direction | MFC flow rate SCCM | Linear velocity cm/min | Reaction temperature ° C. | |
| 1-1 | 2B | bottom→top | 900 | 18.2 | 300 | |
| 1-2 | | bottom→top | 900 | 18.2 | 300 | |
| 1-3 | | bottom→top | 900 | 18.2 | 300 | |
| 1-4 | | bottom→top | 900 | 18.2 | 300 | |
| 1-5 | 20A | bottom→top | 200 | 18.2 | 300 | |
| 1-6 | | top→bottom | 100 | 9.6 | 300 | |
| 1-7 | | top→bottom | 100 | 9.6 | 300 | |
| 1-8 | | top→bottom | 100 | 9.6 | 300 | |

| | NaF | | | | | TFAC | | | |
|---|---|---|---|---|---|---|---|---|---|
| | Lower pellet | | Powder | | Upper pellet | | Effective | introduction | TFAC | |
| Experiment No. | g | mol | g | mol | g | mol | mol*1 | direction | g | mol |
| 1-1 | 150.0 | 3.6 | 400.0 | 9.5 | 151.3 | 3.6 | 11.0 | bottom→top | 729 | 5.5 |
| 1-2 | 150.3 | 3.6 | 400.0 | 9.5 | 150.6 | 3.6 | 11.0 | bottom→top | 1455 | 11.0 |
| 1-3 | 151.5 | 3.6 | 404.3 | 9.6 | 151.6 | 3.6 | 11.1 | bottom→top | 1231 | 9.3 |
| 1-4 | 151.3 | 3.6 | 400.7 | 9.5 | 151.1 | 3.6 | 11.0 | bottom→top | 491 | 3.7 |
| 1-5 | 35.8 | 0.9 | 100.3 | 2.4 | — | — | 2.6 | bottom→top | 87 | 0.7 |
| 1-6 | 25.3 | 0.6 | 100.7 | 2.4 | — | — | 2.5 | top→bottom | 86 | 0.6 |
| 1-7 | 25.6 | 0.6 | 99.7 | 2.4 | — | — | 2.5 | top→bottom | 127 | 1.0 |
| 1-8 | 25.3 | 0.6 | 100.29 | 2.4 | — | — | 2.5 | top→bottom | 224 | 1.7 |

*1The proportion of NaF that reacts effectively is calculated as 20% from the past results. For example, NaF pellets are large in size as having a diameter of 1 mm and a height of 3 mm and hence calculated by multiplying by 20% as the specific surface area. Accordingly, a calculation was made as 3.6 mol × 0.2 + 9.5 mol + 3.6 mol × 0.2 = 11.0 mol in the case of Experiment No. 1-1.

TABLE 2

| | Experimental Results | | | |
|---|---|---|---|---|
| Experiment No. | TFAF Theoretical yield g | Amount trapped g | GC purity % | Yield TFAC basis mass % |
| 1-1 | 638 | 646 | 96 | 88.6 |
| 1-2 | 1274 | 1262 | | 86.7 |
| 1-3 | 1078 | 1070 | 96 | 86.9 |
| 1-4 | 430 | 427 | | 87.0 |
| 1-5 | 76 | 74 | 95 | 85.1 |
| 1-6 | 75 | 73 | 97 | 84.9 |
| 1-7 | 111 | 608 | 95 | 85.0 |
| 1-8 | 196 | 200 | 97 | 89.3 |

As shown in the test results of Table 2, it is possible according to the present invention to efficiently convert a carboxylic acid chloride into a carboxylic acid fluoride at a high yield of 80% or more solely by allowing a metal fluoride to pass through.

[Example 2] (Production Method Using $CrF_3/C$)

A SUS wool was disposed in the lower portion of a 2B vertical SUS reactor, and the reactor was filled with 17 to 33 mass % of $CrF_3$ supported on C ($CrF_3/C$) on the SUS wool. The reactor was heated to 200° C. to 350° C., and $CF_3C(O)Cl$ (TFAC) was allowed to flow therethrough. The formation of $CF_3C(O)F$ (TFAF) was confirmed by GC analysis of the outlet gas. A 500 mL cylinder was cooled with liquid nitrogen to trap the formed $CF_3C(O)F$ (TFAF).

TABLE 3

| | $CF_3COF$ Synthesis Using 17 mass % of $CrF_3$ Supported on C ($CrF_3/C$) | | | | | | | |
|---|---|---|---|---|---|---|---|---|
| | | $CrF_3/C$ reactor | | | | | | |
| | | $CrF_3/C$ | | | TFAC | | | |
| Experiment No. | Reactor size | g | mol (carrying rate of 17%) | SUS wool g | Amount introduced g | | Reaction temperature ° C. | TFAF yield % |
| | | | | | g | mol | | |
| 2-1 | 2B × 1 m | 1019 | 1.59 | 12 | 750 | 5.66 | 350 | 99 |
| 2-2 | 2B × 1 m | 1019 | 1.59 | 12 | 650 | 4.91 | 350 | 99 |
| 2-3 | 2B × 1 m | 1019 | 1.59 | 12 | 700 | 5.28 | 350 | 99 |
| 2-4 | 2B × 1 m | 1019 | 1.59 | 12 | 600 | 4.53 | 350 | 95 |
| 2-5 | 2B × 1 m | 1019 | 1.59 | 12 | 900 | 6.79 | 200 | 99 |
| 2-6 | 2B × 1 m | 1019 | 1.59 | 12 | 400 | 3.02 | 300 | 97 |
| 2-7 | 2B × 1 m | 1019 | 1.59 | 12 | 650 | 4.91 | 350 | 98 |
| 2-8 | 2B × 1 m | 1019 | 1.59 | 12 | 500 | 3.77 | 325 | 90 |
| 2-9 | 2B × 1 m | 1019 | 1.59 | 12 | 600 | 4.53 | 350 | 95 |

TABLE 3

| | | CrF$_3$/C reactor | | | | | |
|---|---|---|---|---|---|---|---|
| | | CrF$_3$/C | | | | | |
| | | | mol | | TFAC | | |
| | | | (carrying | SUS | Amount | Reaction | TFAF |
| Experiment | Reactor | | rate of | wool | introduced | temperature | yield |
| No. | size | g | 33%) | g | g      mol | ° C. | % |
| 2-10 | 2B × 1 m | 1015 | 3.1 | 12 | 1150  8.68 | 350 | 94 |
| 2-11 | 2B × 1 m | 1015 | 3.1 | 12 | 1100  8.30 | 320 | 95 |
| 2-12 | 2B × 1 m | 1015 | 3.1 | 12 | 1100  8.30 | 320 | 95 |

The results of Tables 3 and 4 reveal that according to the present invention, a raw material gas and a metal fluoride react efficiently to exhibit the conversion rate of a carboxylic acid chloride into a carboxylic acid fluoride of 90% or more when the metal fluoride is supported.

The invention claimed is:

1. A method of producing a carboxylic acid fluoride, comprising reacting a carboxylic acid chloride with a metal fluoride,
   wherein the carboxylic acid chloride is allowed to flow as a gas through pellets and/or powders comprising the metal fluoride filled in a reactor to conduct the reacting,
   wherein the carboxylic acid chloride is derived from a carboxylic acid selected from the group consisting of formic acid, acetic acid, propanoic acid, n-butanoic acid, isobutanoic acid, n-pentanoic acid, isopentanoic acid, neopentanoic acid, n-hexanoic acid, isohexanoic acid, neohexanoic acid, n-heptanoic acid, isoheptanoic acid, neoheptanoic acid, and combinations thereof,
   wherein at least one hydrogen atom on the carboxylic acid may be replaced by fluorine, and
   wherein the metal fluoride is selected from the group consisting of at least one lithium fluoride, sodium fluoride, cesium fluoride, potassium fluoride, magnesium fluoride, calcium fluoride, barium fluoride, chromium fluoride, molybdenum fluoride, manganese fluoride, iron fluoride, cobalt fluoride, copper fluoride, nickel fluoride, zinc fluoride, silver fluoride, or combinations thereof.

2. The method according to claim 1 wherein the carboxylic acid is a carboxylic acid substituted with fluorine.

3. The method according to claim 2, wherein the carboxylic acid is a perfluorocarboxylic acid.

4. The method according to claim 3, wherein the carboxylic acid is trifluoroacetic acid.

5. The method according to claim 1, wherein the metal fluoride is supported on at least one carrier selected from the group consisting of activated carbon, alumina, zeolites, and metal foams.

6. The method according to claim 1, wherein a reaction temperature is 100° C. to 500° C.

7. The method according to claim 1,
   wherein the carboxylic acid fluoride is trifluoroacetic acid fluoride,
   wherein the carboxylic acid chloride is trifluoroacetic acid chloride, and
   wherein the metal fluoride is sodium fluoride.

8. The method according to claim 1,
   wherein the carboxylic acid fluoride is trifluoroacetic acid fluoride,
   wherein the carboxylic acid chloride is trifluoroacetic acid chloride, and
   wherein the metal fluoride is chromium fluoride.

9. The method according to claim 8,
   wherein the chromium fluoride is supported on at least one carrier selected from the group consisting of activated carbon, alumina, zeolites, and metal foams.

10. The method according to claim 9, wherein the chromium fluoride is CrF$_3$/C.

* * * * *